United States Patent [19]

Doveri

[11] 4,180,280
[45] Dec. 25, 1979

[54] FRONT-WHEEL SUSPENSION FOR TWO- OR THREE-WHEELED VEHICLES

[75] Inventor: Carlo Doveri, Pontedera, Italy

[73] Assignee: Piaggio & C. S.p.A., Genoa, Italy

[21] Appl. No.: 837,382

[22] Filed: Sep. 27, 1977

[30] Foreign Application Priority Data

Feb. 10, 1977 [IT] Italy ................................ 20164 A/77

[51] Int. Cl.$^2$ ............................................. B62K 21/02
[52] U.S. Cl. ...................................... 280/277; 280/286; 280/696; 188/26
[58] Field of Search .............. 280/277, 285, 286, 96.3, 280/691, 696; 188/26

[56] References Cited

U.S. PATENT DOCUMENTS

| 435,477 | 9/1890 | Blackledge | 280/277 |
|---|---|---|---|
| 979,674 | 12/1910 | Kittle | 280/277 |
| 1,306,766 | 6/1919 | Kuisper | 188/26 |
| 2,953,395 | 9/1960 | Turner | 280/276 |
| 3,931,871 | 1/1976 | Martin | 188/26 X |

FOREIGN PATENT DOCUMENTS

| 1122392 | 1/1962 | Fed. Rep. of Germany | 180/32 |
|---|---|---|---|
| 17291 | of 1905 | United Kingdom | 280/277 |

Primary Examiner—John P. Silverstrim
Attorney, Agent, or Firm—Cushman, Darby & Cushman

[57] ABSTRACT

A front-wheel suspension is disclosed, especially for two-wheeled vehicles such as motor-assisted bicycles and motor-scooters, in which the usual swinging front fork is replaced by a single goose-necked stiff arm capable of overhangingly carrying the vehicle front wheel and pivotally connected, at its bottom end, to the wheel axle by the intermediary of a swingable link. A springing and shock-absorbing telescopable member is pivotally connected, at its top, to an intermediate portion of said arm and, at its bottom, to the wheel axle. A brake device is rigidly connected to the shock-assembly member. The construction is much simplified over the prior art and the costs are significantly reduced: a favorable distribution of the stresses throughout the entire system is also achieved.

5 Claims, 3 Drawing Figures

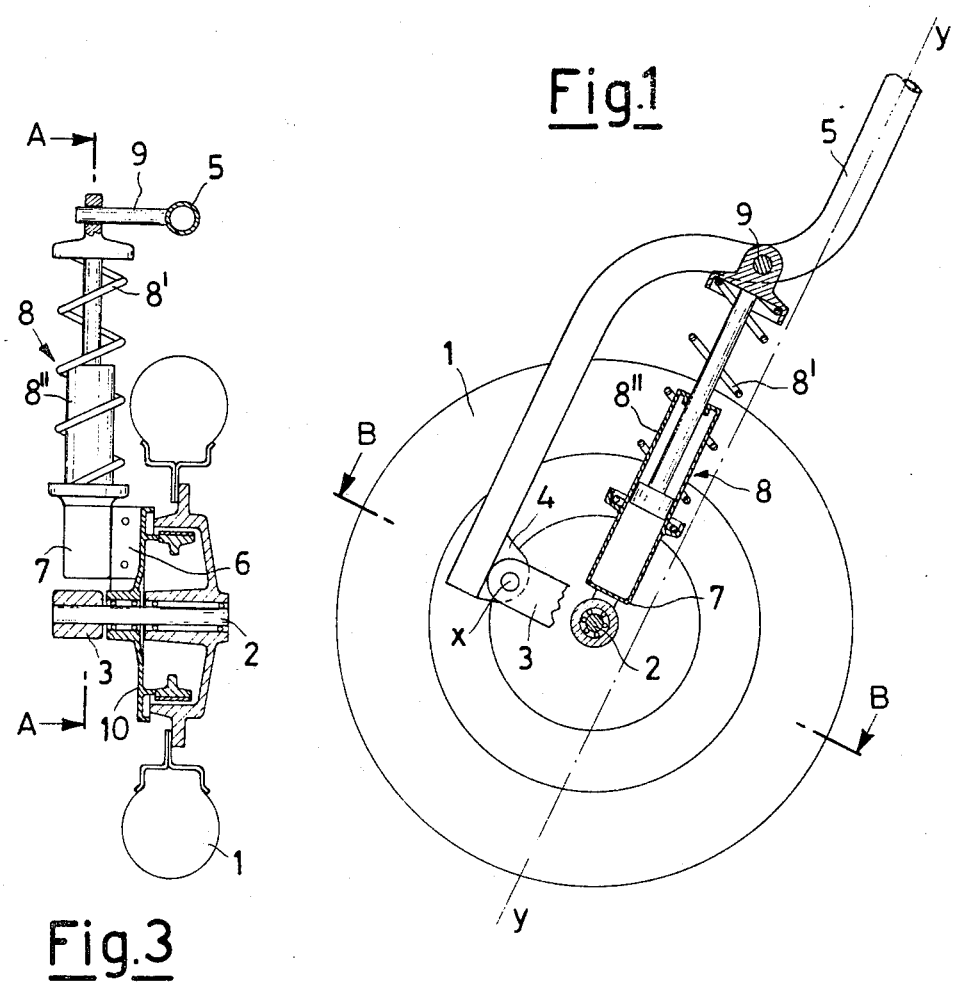
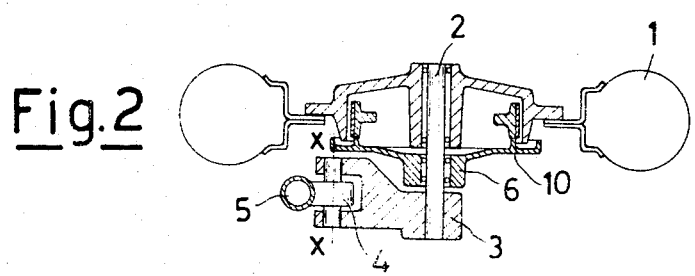

FRONT-WHEEL SUSPENSION FOR TWO- OR THREE-WHEELED VEHICLES

This invention relates to a suspension of a wheel of a vehicle, which is particularly adapted for the front wheel which directs the movements of a two- or three-wheeled vehicle, said suspension being characterized by functional and constructional properties which are particularly advantageous over the suspension which are used at present for the motor-assisted vehicles.

Among the properties which are particularly appreciated for the motor cycles due to their influence on the manoeuverability of the steering handle, the vehicle stability, the economy in first and running costs, particular mention is deserved by the reduction of downward stroke during oscillation, especailly when bumps are experienced, the maintenance of the functionality during braking, lightweight and the reduction of the number of the component parts.

Telescopic-fork suspension are widespread, which maintain the constancy of the downward stroke and absorb the bumps on the motor cycles fairly well also during braking, since the braking moment does not load the suspension springs and thus does not reduce the excursion of the springs.

Such suspensions, however, are impaired by certain defects among which most important is that of the wear of the sliding guides of the telescoping members as due to the high transversal loads relative to the direction of the sliding velocity, which are experienced also during the normal operation of the suspension due to the bending moments on the telescoping legs as caused by the reactions of the ground. In addition to the cons-equent necessity of a frequent upkeep, to prevent the quick increase of the clearances and thus also of the bumps and losses of lubricant and shock-absorbing fluid, friction may have a negative bearing also on the optimization of the dampening efficiency of the suspension. Other serious drawbacks are the high weight and cost as due just to the necessity of accurate machining and resistance of the materials so as to reduce wear and also to the requirement of imparting to the long fork that stiffness, especially in terms of twist resistance, which is sufficient to have a stable vehicle.

Other widely used suspensions are those of the type having longitudinally oscillating arms which are properly sprung and which support the wheel axle either forward or rearward. These suspensions thus have cylindrical matching surfaces only and thus are much less prone to wear and their component parts, moreover, operate under more favourable conditions so that they can be more lightweight. They, however, do not afford the above indicated advantages which are proper of the telescopical suspensions.

The constancy of the downward stroke and the ability of absorbing the braking moment by rigid component parts can be achieved, on the contrary, also with the suspensions of the type having longitudinal parallelograms; they, however, are very intricate and much less resistant to twisting forces, the weight being the same, due to the considerable number of component parts pivotally linked to each other.

The number of component parts of said suspensions can nearly be halved by mounting the wheel on a plane which is in a cantilever relationship relative to the suspension, as it occ-urs in motor cars, but the increase in size and weight required in order to minimize the lateral deformations which are caused by the stresses due to the defect of symmetry of the suspension relative to loads lying on the wheel plane, can be accepted, from a practical standpoint, in the only case of the suspensions having very short oscillating arms but a few of the advantages aforementioned must thereby be given up.

None of the suspensions as employed heretofore for the front wheel of motor cycles has attained till now, a satisfactory trade off between operability and economy.

The subject-matter of the present invention is just an approach to solve the problem aforementioned since it permits that a small variation of the downward stroke may be obtained while absorbing the braking moment without influencing the stroke of the suspension and with the adoption of the least possible number of component parts, these latter working under the best possible conditions of distribution of the stresses, that which involves the maximum possible economy in first and running costs.

The suspension according to the present invention is essentially characterized in that it is composed by a single longitudinally oscillating stiff arm, the oscillation taking place in a steering plane parallel to the wheel plane, the wheel being properly mounted in a cantilever fashion on the suspension, and by a single hinged telescopical leg, the leg being hinged at its bottom beneath said arm and at its top to a point of the structure of the handle bar, the axis of the wheel intersecting the straight line which conjoins such hinge points of said telescopical leg, and more particularly said axis coincides with the axis of the hinge between said arm and said leg, the component part intended to react to the moment of the braking force acting upon the wheel being constructionally made as an entity with said telescopical leg.

In order that this invention may be better understood, a particular embodiment thereof is shown in the Figures of the accompanying single sheet of drawings.

In the drawings:

FIG. 1 shows the invention in side-elevational view, partly in cross-section, taken along the line A—A of FIG. 3.

FIG. 2 shows the invention in cross-sectional view, taken along the line B—B of FIG. 1, and FIG. 3 shows a rear view of the invention, the wheel being shown partially in cross-sectional view.

The wheel 1 can be rotated about the pin 2 which is integral with the arm 3: the latter oscillates about the axis x-x of the bearing 4 and this bearing is borne by the handle-bar tube 5. The pin 2, in addition, is rotatably coupled, through the member 6, to the end 7 of the telescopical leg 8: the leg houses the resilient mem-bers 8' and the shock-absorbing members 8" of the suspension, and is hinged at the top, at the point 9, to the handle-bar tube.

The end 7 of the telescopical leg, in addition, is fast to the plate 10 which carries the brake shoes, of the drum brake type, and the relevant control mem-bers.

All the forces and the transversal bending moments, a well as the twisting moments applied to the suspension by the loads active upon the wheel can be absorbed and transferred onto the steering structure 5 by the arm 3 only, and the latter must thus be adequately sized. The loads lying on the plane of the wheel and passing through the axis of the handle-bar can be absorbed by the arm 3 of the telescopable leg which thus works under compression and pull only and thus is not subjected to stresses due to transversal forces.

The variation of the downward stroke during the oscillation is restricted by the fact that in the normal operative position the axle of the arm 3, having an appropriate length, is nearly perpendicular to the axis y-y of rotation of the handle-bar.

During braking, the reaction torque acting on the plate 10 is transferred to the handle-bar tube through a force which passes through the axis of the pin 2 and the axis x-x of oscillation of the arm 3, and a force, parallel and contrarywise directed, which acts in the point of junction 9 of the telescoping leg.

Inasmuch as the axis of the arm 3 and the axis of the telescoping member 8 form, during oscillation, an angle which is but slightly different from the average angle of 90 degrees, the components of said reactional forces biassing the braking torque will stress in a quite negligible manner the resilient members of the telescopic member. The reaction to the braking moment, as applied to the point 9 impresses, conversely, a bending stress to the telescoping leg, but to a degree which is much slighter than it would have been in the case of a completely telescopable suspension since the latter is supposed also to support the braking force. In the suspension according to this invention, the braking force is absorbed predominantly by the arm 3. The stroke of the suspension as absorbed by the braking force is thus virtually nil.

The invention, thereforen fulfils the requirements set forth above by employing a reduced number of component parts which are simple as themselves and which are connected together in a simple way, the loads being distributed thereamong in a well balanced manner. The result is lightweight and low cost combined, that which is a long felt want for motor cycles.

Be it understood that the above set forth specification and the accompanying drawings refer only to a particular embodiment of the invention, since the latter can be differently embodied as to the constructional form and details without departing from the scope thereof.

For example, the wheel pin can be inserted into the telescopable leg rather than on the swinging arm and it can be non-coincident with the connection hinge between the leg and the arm. Thus the braking system can be of the disc type rather than of the drum type and the swinging arm can be placed behind the wheel rather than before the same and such changes can also be variously combined with one another.

I claim:

1. In a wheel suspension system: a device for imparting steering movement to a wheel, said wheel being rotatably mounted on a single rigid arm for rotation relative to said arm about the axis of the wheel and said arm extending in a plane normal to said wheel axis; means pivoting said arm at a location spaced from said wheel axis to said steering device so that said arm can swing in said plane; a telescopic leg extending substantially perpendicular to said arm, said leg including resilient means biasing said leg toward an extended position, said leg having an upper end pivoted to said steering device for movement about an axis parallel to said wheel axis and said leg having a lower end pivoted to said arm for movement about an axis which is parallel to said wheel axis and which coincides with the pivot axis between said wheel and said arm, the pivot axes of said upper and lower ends being normal to and intersecting the longitudinal axis of said leg and said wheel axis intersecting a straight line joining said pivot axes; and a wheel-braking assembly rigidly connected to said leg.

2. In a suspension system for a vehicle wheel: a supporting structure; a single rigid arm pivotally carrying the wheel; means pivoting said arm, at a location spaced from the axis of the wheel, to said supporting structure so that the wheel and arm can swing in a plane parallel to the plane of the wheel; a single telescopic leg including resilient members, said leg having an upper end pivoted to said supporting structure and having a lower end pivoted to said arm by a single pin which is fixed to said arm and which also pivots said wheel to said arm, said arm extending in a direction substantially perpendicular to the axis of said telescopic leg; and a wheel-braking system rigidly connected to said telescopic leg.

3. A wheel suspension system as in claim 1 wherein the wheel-braking system is a drum brake system including brake shoes and wherein the lower end of said telescopic leg is connected to a plate which carries the brake shoes.

4. A wheel suspension system as in claim 2 wherein said pivot means between said arm and said supporting structure is located forwardly of the pivot axis of said wheel.

5. A wheel suspension system as in claim 2 wherein said supporting structure is the steering device of a wheeled vehicle having at least two wheels.

* * * * *